Patented Sept. 4, 1951

2,567,038

UNITED STATES PATENT OFFICE 2,567,038

DRYING FRUIT JUICES

Jesse W. Stevens, Upland, and David E. Pritchett and Willard E. Baier, Ontario, Calif., assignors to California Fruit Growers Exchange, Los Angeles, Calif., a corporation of California No Drawing. Application August 4, 1950, Serial No. 177,766

12 Claims. (Cl. 99—206)

This invention relates to new methods for preparing dried fruit juice concentrates.

This application is a continuation in part of our prior application, Serial No. 690,328, filed August 13, 1946, now abandoned.

It is an object of this invention to prepare dried fruit juice concentrates of sufficient nutritive, flavor, and color stability to meet ordinary commercial requirements.

Another object of the invention is to prepare dried fruit juice concentrates which, when redissolved in water, will produce a beverage having a palatable flavor approximating that of a beverage made from the corresponding fresh fruit.

A further object of this invention is to provide a method for drying fruit juices which is capable of being adequately controlled under practical operating conditions.

Other more specific objects of the invention will be obvious to those skilled in the art from the disclosure which follows.

Many methods have been described in the literature for dehydrating fruit juices such as, for example, orange juice or lemon juice. The dehydration of these juices, particularly those of high acidity, such as citrus fruit juices is fraught with many difficulties and requires careful control. To our knowledge no process heretofore described will produce an entirely satisfactory dried concentrate at a practical cost.

Many of the processes that have been described are based on vacuum distillation. We have found that simple vacuum distillation alone will not yield a dried juice under practical operating conditions. In an ordinary vacuum pan and at moderate temperatures, most of the water can be removed, but when the juice has been concentrated to the point where it contains only 10% to 15% of water, further evaporation proceeds only slowly and with difficulty. If the temperature is raised to speed up the evaporation, the flavor stability and vitamin content of the juice will rapidly deteriorate. On the other hand, excessively long periods of time are required to dry a juice at low temperatures, even employing a high vacuum. All of these methods yield a juice product which is extremely hygroscopic.

Other methods of concentration embody spray drying of the juice, either at normal or reduced pressures. Such methods have numerous disadvantages. They are costly and require careful control. Moreover, as a result of the drastic heating conditions generally required, the dried product is nearly always found to be poor in flavor and general stability. Also such products are extremely hygroscopic, due partly to the natural hygroscopicity of juice solids and partly to the caramelization which takes place as a result of heating, and particularly of heating applied when the juice is in a solid or nearly solid state. In spray drying a juice, it is particularly necessary, due to the hygroscopic nature of the juice solids, to continue, and in most cases increase, the heating requirements as the droplets of juice become more concentrated. Applicants' process, on the other hand, is designed to reduce to a minimum the heating applied to the juice when it has reached a very concentrated stage.

Concentration by freezing out part of the water has also been proposed, but obviously this method will not produce a dry product.

Our process embodies a combination of several steps which we have found to result in a substantially dry juice powder of satisfactory flavor and general stability. Briefly outlined, our process may comprise the following steps:

I. Buffering or partly neutralizing, or buffering and partly neutralizing some of the juice acidity, to raise the pH of the juice.

II. Pasteurizing the juice under such conditions as to destroy microorganisms and to selectively inhibit or inactivate undesirable enzyme activity, while permitting some desirable enzyme activity.

III. Concentrating the buffered and partially inactivated juice under suitable vacuum conditions at moderate temperatures until the juice contains about 75% to 90% solids.

IV. Improving the stability of the dried juice by addition, at any stage in the process, of a small percentage of ascorbic acid.

V. Adding the concentrated juice to a granular sugar in such quantities as not to completely dissolve the sugar but to produce a moist, granular mixture. The sugar used at this step may contain a small percentage of an edible carbonate which will liberate carbon dioxide upon addition of the juice.

VI. Drying the sugar-juice mixture either in a vacuum drier or by means of an air drier.

These various steps may be more readily understood and applied by reference to the more detailed disclosure which follows.

Following are two specific examples showing preferred procedures, one for dehydrating orange juice and one for dehydrating lemon juice:

*Example I*

A mixture consisting of 85% calcium carbonate and 15% sodium carbonate was added to a quantity of Valencia orange juice at the rate of 1.05 pounds of the mixer per 100 gallons of juice. The pH of this buffered and partially neutralized juice was 4.13. It was then passed through a flash pasteurizer where it was held at about 77° C. for about 1 minute, and then concentrated in a large vacuum pan until the juice contained about 70% soluble solids. It was then transferred to a smaller vacuum pan where concentration was continued until the juice contained about 82% soluble solids. The pH of the concentrate obtained was about 3.8 and it contained 5.53% of citric acid, calculated as anhydrous.

Two portions of the concentrated juice obtained as above were each mixed with substantially dry, granular sucrose in the proportion of 1 part of concentrated juice to about 2.6 parts of sucrose. The sucrose used contained 0.6% of calcium carbonate. In each case there resulted a moist granular mixture of sugar and concentrated juice. One of the portions was tray dried in an air drier, the atmosphere of which was maintained at about 50° C. The drying time required was about 36 hours. The other portion was dried in a tray under partial vacuum, wherein a stream of air was maintained at about 50° C. In this latter case the drying was complete in about 9 hours. In each case the mixture dried satisfactorily and the dried concentrates were substantially moisture free and contained about 24% juice solids. The end products were, for practical and utilitarian purposes, similar, but the vacuum dried product was considered superior.

The dried concentrates prepared as outlined above have a ratio of total soluble solids to free acid of about 85:1. This high solids/acid ratio is caused partly by the partial neutralization of acid which occurred when the pH of the juice was raised, but is mainly due to the fact that the dried product contains about 75% added sugar.

A satisfactory orange beverage containing added sugar and acid should have approximately the following analysis:

Total soluble solids_____Percent__ 14.3
Total citric acid, anhydrous_____do_____ 0.58
Solids/acid ratio_____ 24.7:1
Soluble juice solids_____Percent__ 3.5

In order to make a suitable dry beverage base which will yield a beverage corresponding approximately to the illustrative analysis given above, the drive concentrate obtained in the above example is mixed with about 3% of anhydrous citric acid. This may be done at the time the beverage is made up, or the acid may be added directly after drying the concentrate. We have found that the added citric acid has no appreciable effect on the flavor stability or keeping quality of the dried product. This acid should not be added until the juice is in solid form, otherwise the purpose in buffering the juice will be largely defeated.

To make a satisfactory orange beverage, the dried concentrate, fortified with added citric acid, should be dissolved in about six times its weight of water. More or less water may be added to the fortified concentrate according to individual tastes.

Example II

To 500 parts by weight of strained natural strength lemon juice was added 1 part of calcium carbonate and 3 parts of sodium carbonate. The pH of the buffered juice was 3.01. This juice was then deaerated and pasteurized in a flash pasteurizer at 65° C. with about 40 seconds' holding time.

The pasteurized juice was then concentrated under partial vacuum until the juice contained about 79% solids. At this point the pH of the juice was 1.88 and the ratio of solids/acid was 1.78:1. To 6.8 parts of substantially dry, granular cane sugar was added 1 part by weight of the above concentrate. After mixing, the moist granular mixture was tray dried in a vacuum oven, the atmosphere of which was maintained at about 50° C. and a pressure in the order of about 1 inch of mercury. About 7 hours were required to obtain a substantially moisture free concentrate.

By mixing the dried product with 7 parts of water a satisfactory lemonade is produced containing about 12.5% of the buffered, natural strength lemon juice. The flavor and strength of the product can be improved by adding about 0.8% anhydrous citric acid to the dry product.

The above examples should be taken as illustrative only and not as the limiting scope of our invention. In a manner analogous to the above examples other dried juices may be prepared such as grapefruit juice, grape juice, berry juices, or any other acidic fruit juice.

It is preferable that the original juice should be so extracted from the fruit that it will contain as small an amount of pectic materials as possible. The presence of large quantities of pectin in the juice may result in jellifying of the juice as the concentration proceeds, and the conditions of high acidity and sugar content requisite for gel formation are approached. To avoid this possibility the juice should remain in contact with the fleshy parts of the fruit during extraction for as short a time as possible, since these fleshy portions, including the peel, juice sacs and pulp, contain large quantities of insoluble pectic materials which are extracted by acidic materials such as fruit juices. Various types of juice extractors are available which effectively separate the juice from the fleshy portions of the fruit almost immediately after extraction. The well-known burr type of extractor reams the juice and pulp out of the halved fruit, thus largely preventing contact of the juice with the peel. The mixture of pulp and juice so obtained is then passed almost immediately onto a vibrating screen which quickly permits the juice to pass out of contact with the pulp. Juice extracted in this manner contains a smaller proportion of pectic materials than juice prepared by methods involving, for example, maceration of the whole fruit.

The buffering and/or partial neutralization of the juice acid accomplishes a fourfold purpose:

1. It keeps the active acidity down during concentration, thus, having the effect of preventing pectin gel formation. The partially concentrated juices may contain enough pectin to form a gel at high acidities (low pH) and high sugar concentration, these two conditions being essential for the formation of normal pectin gels. Obviously, as concentration proceeds, the tendency to gel increases, due to increasing concentrations of sugar and acid.

2. At high concentrations, a low pH causes a darkening of the product, makes dehydration more difficult, and causes a more rapid deterioration in flavor.

3. The presence of small quantities of a buffer salt such as sodium citrate, either added as such or formed by the reaction of added sodium compounds with the citric acid of the juice, has been found to improve the body and flavor of the final beverage. An unbuffered beverage has a thin, flat taste.

4. Lowering the acidity (raising the pH) of the juice inhibits excessive inversion of sucrose during concentration and drying. An analysis of the reducing sugar content of concentrated lemon juice for example, and of the dried product, indicated that practically no inversion occurred during the drying step, when the juice was properly buffered.

Many different combinations of buffers and/or neutralizing agents may be used to adjust the pH of the juice. The overall aim in adjusting the pH of the juice is, as specifically outlined above, to facilitate the drying of the juice. Since the pH is the main factor in obtaining those ends, it will be obvious that the desired increase in pH may be obtained in several different ways. In the present case, the preferred methods of raising the pH of the juice have in common the addition to the juice of an alkaline acting material, or materials, which will raise the pH of the juice and will prevent an excessive drop in pH during concentration, such as results when untreated juices are concentrated.

One such method is by the addition of an alkaline material which will chemically combine with part of the citric acid of the juice and form an insoluble citrate. These materials include primarily the calcium compounds such as calcium hydroxide and calcium carbonate. We also include within this general method the use of basic anion exchange resins, such as, for example amineformaldehyde condensation products, from which the absorbed citric acid may be subsequently recovered.

Another method of raising the pH of an acid juice is by the addition of an alkaline buffer salt such as sodium citrate. Here there is no reduction in the uncombined acid of the juice. The hydrogen ion concentration is reduced by simply adjusting the ionic equilibria according to well-known principles.

A third method consists of a combined partial neutralization and buffering procedure. In this case an alkaline material is added to the juice which not only chemically combines with part of the acid, but also in so doing, forms a buffer salt. Materials in this class comprise primarily the alkali metal compounds such, for instance, as sodium hydroxide, sodium carbonate or sodium bicarbonate, or for example, the corresponding lithium compounds. These materials react with the citric acid of the juice to form soluble citrates.

In addition to these three methods, it will, moreover, be obvious to those skilled in the art that any combination thereof may be used. For instance, in the two examples given above, part of the citric acid of the juice was neutralized to form an insoluble citrate, and part was neutralized to form a soluble citrate, which in turn acts as a buffer. It will also be obvious to those skilled in the art that other buffer salts and neutralizing agents may be used than those specifically mentioned above. In general the main requirements are that these materials be edible in the proportions used and meet the generalized requirements set forth above.

Many variables enter into the determination of the proper amount and type of buffers and neutralizing agents to be used. The most important consideration is the initial pH of the juice being treated. This must be raised to the proper point to obtain the desired ends set forth above. As is more fully set forth below, the pH to which the juice is raised varies with the particular juice. It is usually desirable to obtain this adjustment of pH by the use of buffer salts or of neutralizing agents which form buffer salts, since these materials do not lower the soluble solids content of the juice, and in addition add body to the beverage. Moreover, a juice which is not buffered may, even though the initial pH be reasonably high, develop an excessively low pH when the concentration of acid is increased as a result of evaporation of the major part of the aqueous component. The drop in pH during concentration is not nearly so marked in a buffered juice as in an unbuffered juice of the same original pH. Thus, while it is not in all cases necessary to utilize buffer salts in raising the pH of the juice, it is usually the most desirable and convenient method.

However, a buffer salt alone, either added as such or formed in the juice, cannot be used in all cases to obtain a juice within the desired pH range. The presence of too much soluble citrate will produce a salty taste in the product. To avoid this possibility the total amount of soluble citrate in the product should be so adjusted that the final beverage will contain less than about 0.4% and preferably between about 0.1 to 0.25% thereof. The amount may vary with different beverages and different tastes, so that it may truly be said that the final taste is the most reliable test.

It may therefore be necessary, after the maximum tolerable amount of buffer salt has been added, to eliminate enough citric acid to bring the juice within the desired pH range. In the examples this was done by the addition of calcium carbonate to form insoluble calcium citrate. Sufficient of these neutralizing agents should be used to complete the raising of the pH to the desired range. Care should be taken however not to use an excessive quantity of these materials as this may result in the precipitation and separation of large quantities of insoluble citrates. In the quantities ordinarily used, no visible separation of insoluble citrate occurs, owing to the finely divided nature of the precipitate and perhaps to the dispersing power of the pectic materials contained in the juice.

While there are usually no advantages to be gained by raising the pH solely by means of neutralizing agents which form insoluble citrates, it is entirely possible that this may be done in the case of some of the less acidic juices where little adjustment in pH is necessary, and hence where the method of raising the pH is not of critical importance. These juices are often already buffered to some extent by naturally occurring salts contained therein and the desired increase in pH may be obtained by neutralization of buffering or a combination of both. Juices in this class may include for instance orange juice from very mature fruit having a pH of about 3.8.

Juices of intermediate acidity having a pH between about 2.9 and 3.8 usually require some buffering in order to prevent too great a decrease in pH during concentration. This buffering may be accomplished either by the addition of a buffer salt or by the addition of a material which forms a soluble citrate which in turn acts as a buffer. It will also generally be found with this type of juice that, in addition to the use of a buffer, it is also desirable to partially neutralize some of the acid with a basic material which forms an insoluble citrate. Juices in this pH range include most grapefruit and orange juices.

In the highly acidic juices such as lemon juice, which normally has a pH between about 2.1 and 2.5, it is usually necessary to utilize all the methods of raising the pH. This entails the use, first of the maximum tolerable amount of a neutralizing material which forms a soluble citrate which in turn acts as a buffer, and then sufficient of a neutralizing material which forms an insoluble citrate to give the desired pH.

The pH to which a juice should be buffered and/or neutralized depends on the original pH of the juice and, to some extent, upon the specific concentration and/or drying procedures employed. It is not feasible to raise to the same pH range juices which vary greatly in original acidity. The pH of lemon juice, for instance, cannot with satisfactory results, be raised to the same pH level as may orange juice as this would necessitate the neutralization of excessive quantities of citric acid, resulting either in the presence of unpalatable quantities of soluble citrate, or a voluminous precipitation of insoluble citrate.

The principal citrus juices, including orange, lemon and grapefruit juices, normally fall within the range of acidity from about pH 2.0 to pH 3.8. The pH of these juices may very suitably be raised, by the methods outlined above, to within the levels set forth in the following table:

| Original pH of Juice | Adjusted pH of Juice |
|---|---|
| 3.8 | 3.9-4.5 |
| 3.4 | 3.7-4.3 |
| 3.0 | 3.5-4.1 |
| 2.6 | 3.0-3.6 |
| 2.3 | 2.7-3.3 |

Those skilled in the art will understand that by interpolating in the above table, similar data concerning juices of other specific acidities than those listed may be inferred.

It should be noted that the original pH of 2.6 listed above does not correspond to a specific citrus juice. It is slightly higher than the normal pH of lemon juice and lower than the pH of grapefruit juice. It may however correspond to the pH of a mixture of orange and lemon juice or grapefruit and lemon juice. These mixtures of various juices are also contemplated within the scope of our invention.

Most orange juices have a natural pH between about pH 3.4 and 3.8. For most operations the pH of this juice should be raised to about 4.0 although a range from above about pH 3.9 to about pH 4.5 will yield a satisfactory product. Grapefruit juice may preferably be adjusted to a pH of about 3.6 to 4.2. The pH of lemon juice, which ordinarily ranges from about 2.1 to 2.5, should be raised to about pH 3.0 for our preferred operation. A range of about pH 2.5 to 3.3 will yield a satisfactory product.

If the concentration and/or drying procedures employed are very mild in heating requirements, the pH of the juice need not be raised to the same extent as will be desired for best results if a more prolonged, and thus severe, heating is to be employed. The heat required for concentration and the acid of the juice both tend to darken the juice and produce a burnt flavor. These two factors are hence interrelated and should be balanced, one against the other, within the stated limits, in order to avoid burning or darkening of the juice.

The sterilization step set forth in the example is for the purpose of destroying micro-organisms and partially destroying or inactivating the enzymes. Several enzymes appear to be present in citrus juices. At least two of these enzymes which may be present in citrus juices act on the pectic constituents of the juice, breaking them down into less highly organized or polymerized components. These may be in large part pectic or pectinic acids. These depolymerized materials are particularly apt to form gels in the presence of calcium ions. The pasteurization step set forth appears to partially destroy the enzymes responsible for this change and thus helps to prevent gel formation.

However, it is desirable not to destroy all of the enzyme activity. The reason for this is that some initial decomposition of the pectin is desirable because this decreases the viscosity of the sol form of the pectin. At this intermediate stage of decomposition, the sol form of the pectin is of lower viscosity than a sol of the undecomposed pectin, and yet the pectin is not sufficiently decomposed and/or depolymerized to form gels with the calcium of the juice. Both sol viscosity and gel viscosity are undesirable since they increase the difficulties in handling and concentrating the juice.

A very suitable method of effecting this controlled form of pasteurization is that known as "flash pasteurization." This process embodies a heat treatment which is carefully controlled as to duration and temperature and is correlated with the characteristics of the juice being treated. In U. S. Patent No. 2,217,261 is set forth a flash pasteurization process designed to inactivate the enzymes of the juice completely. The methods of operation there set forth are in general suitable for use in the present process, provided that the temperatures and time of heating are so differently adjusted as to achieve our present aim of only partially inactivating the juice enzymes. In the above mentioned patent, certain minimum temperatures limits are set forth for juices of varying acidity, above which it is necessary to maintain the particular juice in order to inactivate the enzymes completely. In the present case, those limits are the approximate maximum temperatures at which the presently desired partial inactivation of enzymes may take place. This range, as set forth in the patent, is as follows:

| | °C. |
|---|---|
| pH 2.2 | 72 |
| pH 2.34 | 75 |
| pH 2.85 | 79 |
| pH 3.17 | 84 |
| pH 3.79 | 89 |

It is possible that those temperature limits may be exceeded slightly in our process if the holding time, that is the length of time during which the particular temperature is maintained, is kept very short, say only a few seconds. However, the optimum temperatures for our desired partial enzyme inactivation are, for juices of each pH listed, about 8 to 12° C. below the corresponding temperature listed. At these optimum temperatures the holding time is not so critical and may range from about 30 seconds to 5 minutes. It is possible to employ temperatures as much as 15° C. below those listed and still obtain adequate partial inactivation of enzymes, particularly with the more highly acidic juices.

It should be understood that in the above table, the pH listed is the pH at which the juice is heat treated, and does not necessarily refer to the original natural pH of the juice. In the two examples which we have given, the juices were first partially neutralized and then pasteurized. In these cases the pH of the partially neutralized juice determined the temperature used. It is quite possible to pasteurize the juice before the pH is raised, and in this case the pH of the raw juice would determined the temperature to be used.

It is to be understood however, that any pasteurization or heat treatment may be used which will accomplish the purposes of selectively inhibiting those enzymic reactions which increase the viscosity of the concentrate, and permitting those enzymic reactions to take place which decrease the viscosity thereof. Temperatures suitable for these purposes usually range from about 60° C. to about 85° C., depending on the acidity of the juice and the duration of treatment. Such a treatment will also, of course, effectively destroy the micro-organisms of the juice.

The concentration step may be performed in any type of vacuum concentrating apparatus, and by any of the well-known methods for partially concentrating juices at low temperatures and pressures. These methods include spraying the juice, or introducing it as a thin film into a vacuum chamber, or simply allowing a mass of the juice to boil or evaporate under appropriate conditions of temperature and pressure. All these methods of concentration will realize a maximum efficiency if suitable means are employed to remove the water vapor from the vacuum chamber substantially as fast as it may be formed under the particular heating conditions. Suitable means for accomplishing this include the use of air or an inert gas as an entraining agent, the use of solid or liquid water absorbing agents, or the water vapor may simply be pumped from the chamber by means of a high vacuum pump. The principle of short path distillation may be utilized by maintaining a condensing surface close to the evaporating surface. At the preferred temperatures, any of the above methods of concentration will be suitable, as well as such other modifications as will be obvious to those skilled in the art. A high enough vacuum should be used so that excessively high temperatures are not necessary. The temperature of the juice itself should be kept below about 50° C., although the temperature of the atmosphere in the vacuum chamber may be slightly higher. Higher temperatures tend to destroy the flavor of the juice. These methods of concentration can be made to proceed efficiently until the juice has been concentrated to the point where it contains only 10 to 15% of water. At this stage the material is a thick syrup containing about 85% to about 90% solids and is difficult to concentrate further in this form without raising the temperature. However, the concentration may be stopped at about 75% solids if desired, and satisfactory final drying still be obtained.

To facilitate the final drying, the concentrated juice is mixed with a granular sugar in sufficient amounts to form a moist, granular, and preferably porous mass. I have found that other sugars besides sucrose may be used, for instance, lactose or dextrose or cerelose. The effect of the sugar appears to be as a spacer or support for the juice. The granular mixture of sugar and juice presents a large surface area, and hence facilitates evaporation. Also the sugar may act as a crystalline "seed" and promote crystalization of the sugar from the supersaturated fruit juice. The amount of sugar to be used, over and above the amount necessary to provide a moist, granular, porous mass, depends largely on the acid content of the juice solids. A lemon juice concentrate containing about 45% citric acid may be mixed with about 7 times its weight of sugar. Upon drying, such a mixture can be dissolved about 1 part in about 7 parts of water to produce a palatable lemonade. An orange juice concentrate may contain only 5% or 6% of citric acid and should be mixed with about 2 to 3 times its weight of sugar. This amount may vary, depending on how much citric acid is to be added to the dried product, and should be calculated to produce a total ratio of citric acid to sugar which will yield a palatable beverage upon being dissolved in the proper amount of water.

The term "granular" sugar, as used herein, is intended to include as its primary and preferred embodiment, those sugars which are substantially dry, such as for example the substantially anhydrous granular sucrose of commerce, which ordinarily contains less than $1/10$ of $1\%$ by weight of moisture. It will be obvious that such substantially dry sugars will be capable of absorbing relatively large quantities of concentrated juice before the granular structure of the mix is destroyed than will those granular sugars which already contain appreciable amounts of water admixed therewith. It is therefore desirable to use substantially dry sugars in order to avoid undue dilution of the juice concentrate with sugar. However, granular sugars which are not substantially dry may be used in cases where a larger ratio of sugar to juice is not undesirable.

It should be kept in mind that, as a general rule, the total heat required to concentrate and dry the juice should be so applied as to cause the least possible damage to the particular juice. This means that the total heating time should be kept as short as possible. This principle may be applied, for instance, to determine the point at which the juice concentrate should be transferred to the sugar for final drying. Since the mixture of sugar and concentrated juice provides a large surface area, it is obvious that evaporation of moisture from such a mass will proceed more rapidly than from a body of liquid having only one surface. For this reason it is desirable to transfer the concentrated juice to the sugar as soon as its moisture content has been reduced to the point where palatable quantities of sugar will yield therewith a moist, porous granual mass having a large surface area. This means that in the case of the highly acidic juices, with which may be mixed large quantities of sugar, the initial concentration need not be carried as far as in the case of less acidic juices. Lemon juice, for instance, may be concentrated only to about 75 to 80% solids, since this concentrate may be mixed with about 7 times its weight of sugar. Orange juice should generally be concentrated to about 80 to 90% solids since smaller quantities of sugar are used. In this manner the more highly acidic juices, which are the most likely to be damaged by heat, may be spared the generally prolonged heating required to vaporize water from a liquid mass of high solids concentration.

We have found that the final drying of the product may be further facilitated by incorporating a small amount, about 0.4% to 0.8%, of a carbonate into the sugar before mixing with the concentrated juice. This carbonate may be calcium carbonate or sodium carbonate or other edible carbonate or mixtures thereof. When the juice is added, the citric acid liberates carbon dioxide gas which helps to carry off water and acts as a spacer to provide an even larger surface area, thus facilitating the drying. It also acts to protect the product from atmospheric oxidation. In using these carbonates, care should be taken not to use so much as to neutralize too much of the citric acid. An acid residue is always essential. The use of about 0.125 gm. of calcium carbonate for each gm. of citric acid, calculated as anhydrous, in the concentrate has proved to be a satisfactory amount. It may be desirable to use a greater or lesser quantity of carbonate, depending upon the amount of citrates already present in the concentrate and resulting from the original buffering or neutralization.

The mixture of sugar and concentrated juice is so much easier to dry than the juice alone that reduced pressure is not always necessary to accomplish the final drying. In most cases, however, a considerably reduced pressure is preferable. If the product is dried at about 50° C. at atmospheric pressure, a longer drying time is required and this results in greater loss in flavor and ascorbic acid content than when vacuum is employed. In a vacuum oven, the atmosphere of which is maintained at about 50° C. and 4 inches of pressure, and wherein a small amount of air or inert gas is used to entrain the water vapor, the product will dry in about one quarter the time required for atmospheric drying and will retain as much as about 99% of its original ascorbic acid. Here, as in the previous concentration step, it is desirable to remove the water vapor from proximity with the evaporating surface as rapidly as possible. The same general means for accomplishing this purpose may be employed as have been previously set forth in connection with the concentration step. These means may be advantageously employed whether the sugar-juice mixture is dried at atmospheric or reduced pressures.

It is generally desirable to add additional citric acid to those dried juices which, either because of the ratio of sugar to juice solids, or because of the initial neutralization of a large percentage of the natural citric acid, would produce a beverage of insufficient tartness. This, of course, is a matter of taste preference and can be varied to suit different tastes. It will generally be found, however, that the low acid juices such as orange juice are nearly always benefited by addition of a small proportion of citric acid.

Another important feature of our invention consists in the addition of an ascorbic acid, preferably l-ascorbic acid, to the prduct. Any of the various ascorbic acids may be used including the dextro and laevo forms. We prefer to use the laevo form since it has a greater stabilizing effect and is more active physiologically than the dextro form.

We have found the addition of an ascorbic acid to have a beneficial effect both on the color stability and on the flavor stability of the product. This results in a product which may be stored for longer periods of time. Also the natural vitamin C content of the juice is stabilized and preserved in a manner not yet fully understood. The ascorbic acid may be added at any point in the process, either to the raw juice, to the juice during concentration, or to the concentrate prior to mixing with the sugar. The amount to be used depends upon the degree of stability which is desired in the final dry product. By adding as little as 2 mg. of ascorbic acid per gm. of the dried material, a substantial improvement in the quality and stability of the product will result. If the product is to be stored for long periods of time, or stored under adverse climatic conditions, the proportion of ascorbic acid may be increased to as much as about 9 mg. per gm. of the dried product. The range from about 2 to 4.5 mg. per gm. of dried product will be found to be satisfactory under normal conditions.

The dried juices prepared by our process are all more or less hygroscopic and should be protected from the atmosphere. They are relatively stable both as to flavor and color as compared to products prepared by known processes. They are not stable indefinitely; after a long period of time they tend to darken and develop an off flavor which is not particularly displeasing.

The flavor of the product may often be improved by adding a small amount of appropriate oil flavor to the dried product, such as orange oil or lemon oil. For this purpose, when working with citrus, we have found the terpeneless citrus oils to be most satisfactory.

The hygroscopicity of the product is caused largely by the juice solids and those products containing the largest proportions of juice solids are the most difficult to dry and the most hygroscopic.

Having described our invention in such full, clear, and exact terms as to enable others skilled in the art to practice the invention, we claim as our invention:

1. A process for preparing a dried acidic fruit juice which comprises the steps of raising the pH of the juice by the addition of alkaline acting material, and subjecting it to a heat treatment sufficient to partially inactivate the enzymes thereof, then concentrating the juice by evaporation of liquid at low temperatures and low pressures until the juice contains about 75 to 90% solids, suspending the concentrated juice on at least a sufficient amount of a granular sugar to produce a moist granular mixture, and dehydrating said mixture to produce a substantially dry product.

2. A process for preparing a dried citrus juice which comprises raising the pH of the juice to a point between its original pH and about pH 4.5 by the addition of alkaline acting material, then concentrating the juice by evaporation of liquid at low temperatures and low pressures until the juice contains about 75 to 90% solids, suspending the concentrated juice on at least a sufficient amount of a granular sugar to produce a moist granular mixture, and dehydrating said mixture to produce a substantially dry product.

3. A process for preparing a dried citrus juice which comprises the steps of raising the pH of the juice to a point between its original pH and about pH 4.5 by the addition of alkaline acting material, and subjecting it to a heat treatment sufficient to partially inactivate the enzymes thereof, and thereafter concentrating the juice by evaporation of liquid at low temperatures and low pressure until the juice contains about 75 to 90% solids, stabilizing the concentrated juice by the addition of a small proportion of ascorbic acid, suspending the stabilized concentrate on at least a sufficient amount of a granular sugar to produce a moist granular mixture, and dehydrating said mixture to produce a substantially dry product.

4. A process for preparing a dried citrus juice which comprises raising the pH of the juice to a point between its original pH and about pH 4.5 by the addition of alkaline acting material, then concentrating the juice by evaporation of liquid at low temperatures and low pressures until the juice contains about 75 to 90% solids, stabilizing the concentrated juice by the addition of a small proportion of ascorbic acid, suspending the stabilized concentrate on at least a sufficient amount of a granular sugar to produce a moist granular mixture, and dehydrating said mixture to produce a substantially dry product.

5. A process for preparing a dried orange juice which comprises raising the pH of the juice to a point between about 3.9 and 4.5, and thereafter subjecting it to a heat treatment sufficient to partially inactivate the enzymes thereof, then concentrating the juice by evaporation of liquid at low temperatures and low pressures until the juice contains about 75 to 90% solids, stabilizing the concentrated juice by the addition of a small proportion of ascorbic acid, suspending the stabilized concentrate on at least a sufficient amount of a granular sugar to produce a moist granular mixture, and dehydrating said mixture to produce a substantially dry product.

6. A process for preparing a dried orange juice which comprises raising the pH of the juice to a point between about 3.9 and 4.5, and thereafter subjecting it to a heat treatment sufficient to partially inactivate the enzymes thereof, then concentrating the juice by evaporation of liquid at low temperatures and low pressures until the juice contains about 75 to 90% solids, suspending the concentrated juice on at least a sufficient amount of a granular sugar to produce a moist granular mixture, and dehydrating said mixture to produce a substantially dry product.

7. A process for preparing a dried lemon juice which comprises raising the pH of the juice to a point between about 2.5 and 3.3 by the addition of alkaline acting material, and thereafter subjecting it to a heat treatment sufficient to partially inactivate the enzymes thereof, then concentrating the juice by evaporation of liquid at low temperatures and low pressures until the juice contains about 75 to 90% solids, stabilizing the concentrated juice by the addition of a small proportion of ascorbic acid, suspending the stabilized concentrate on at least a sufficient amount of a substantially dry, granular sugar to produce a moist granular mixture, and dehydrating said mixture to produce a substantially dry product.

8. A process for preparing a dried lemon juice which comprises raising the pH of the juice to a point between about 2.5 and 3.3 by the addition of alkaline acting material, and thereafter subjecting it to a heat treatment sufficient to partially inactivate the enzymes thereof, then concentrating the juice by evaporation of liquid at low temperatures and low pressures until the juice contains about 75 to 90% solids, suspending the concentrated juice on at least a sufficient amount of a substantially dry, granular sugar to produce a moist granular mixture, and dehydrating said mixture to produce a substantially dry product.

9. A process for preparing a dried orange juice which comprises raising the pH of the juice to about 4.13 by the addition of a mixture comprising calcium carbonate and sodium carbonate, and thereafter subjecting the partially neutralized juice to a heat treatment at about 77° C. to partially inactivate the enzymes, then concentrating the juice by evaporation of liquid at low temperatures and low pressures until the juice contains about 82% solids, suspending the concentrated juice on a sufficient amount of substantially dry, granular sucrose containing an effervescent carbonate to produce a moist granular mixture, dehydrating said mixture to produce a substantially dry product, and adding to the dried juice about 3% of anhydrous citric acid.

10. A process for preparing a dried lemon juice which comprises raising the pH of the juice to about 3.0 by the addition of a mixture comprising calcium carbonate and sodium carbonate, and thereafter subjecting the partially neutralized juice to a heat treatment at about 65° C. to partially inactivate the enzymes, then concentrating the juice by evaporation of liquid at low temperatures and low pressures until the juice contains about 79% solids, suspending the concentrated juice on a sufficient amount of substantially dry, granular sucrose to produce a moist granular mixture, and dehydrating the mixture to produce a substantially dry product.

11. A product for preparing a dried grapefruit juice which comprises raising the pH of the juice to a point between about 3.6 to 4.2 by the addition of alkaline acting material, and thereafter subjecting it to a heat treatment sufficient to partially inactivate the enzymes thereof, then concentrating the juice by evaporation of liquid at low temperatures and low pressures until the juice contains about 75 to 90% solids, suspending the concentrated juice on at least a sufficient amount of a substantially dry, granular sugar to produce a moist granular mixture, and dehydrating said mixture to produce a substantially dry product.

12. A process for preparing a dried grapefruit juice which comprises raising the pH of the juice to a point between about 3.6 to 4.2 by the addition of alkaline acting material and thereafter subjecting it to a heat treatment sufficient to partially inactivate the enzymes thereof, then concentrating the juice by evaporation of liquid at low pressures until the juice contains about 75 to 90% solids, stabilizing the concentrated juice by the addition of a small proportion of ascorbic acid, suspending the stabilized concentrate on at least a sufficient amount of a substantially dry, granular sugar to produce a moist granular mixture, and dehydrating said mixture to produce a substantially dry product.

JESSE W. STEVENS.
DAVID E. PRITCHETT.
WILLARD E. BAIER.

No references cited.

Certificate of Correction

Patent No. 2,567,038 September 4, 1951

JESSE W. STEVENS ET AL.

It is hereby certified that error appears in the printed specification of the above numbered patent requiring correction as follows:

Column 3, line 1, for "mixer" read *mixture*; line 52, for "drive" read *dried*; column 8, line 47, for "temperatures" read *temperature*; column 9, line 13, for "determined" read *determine*; column 10, line 31, for "large" read *larger*; column 11, line 62, for "prduct" read *product*; column 14, line 55, after "low" insert *temperatures and low*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*